United States Patent
Nakamura et al.

(10) Patent No.: US 11,926,492 B2
(45) Date of Patent: Mar. 12, 2024

(54) LINEAR TRANSPORT APPARATUS

(71) Applicant: Mitsubishi Electric Corporation, Tokyo (JP)

(72) Inventors: Takuma Nakamura, Tokyo (JP); Shin Sakai, Tokyo (JP); Masaoki Iwase, Tokyo (JP); Kazuhiko Fukushima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/035,932

(22) PCT Filed: Jun. 17, 2021

(86) PCT No.: PCT/JP2021/023076
§ 371 (c)(1),
(2) Date: May 9, 2023

(87) PCT Pub. No.: WO2022/264371
PCT Pub. Date: Dec. 22, 2022

(65) Prior Publication Data
US 2023/0322275 A1    Oct. 12, 2023

(51) Int. Cl.
*B65G 54/02* (2006.01)
*B61B 13/12* (2006.01)
(Continued)

(52) U.S. Cl.
CPC .............. *B65G 54/02* (2013.01); *B61B 13/12* (2013.01); *B61L 13/04* (2013.01); *B61L 25/025* (2013.01); *B65G 35/06* (2013.01)

(58) Field of Classification Search
CPC ........ B65G 54/02; B65G 35/06; B61B 13/00; B61B 13/04; B61B 13/12; E01B 25/10; B60B 17/0082; B60L 13/03; B61L 25/025
(Continued)

(56) References Cited

U.S. PATENT DOCUMENTS 4,860,662 A * 8/1989 Matsumoto ............. E01B 25/10
                                                       104/107
5,492,066 A    2/1996 Nozaki et al.
(Continued)

FOREIGN PATENT DOCUMENTS

DE    10 2014 110 714 A1    2/2016
JP    6-64868 A              3/1994
(Continued)

OTHER PUBLICATIONS

International Search Report and Written Opinion dated Aug. 31, 2021, received for PCT Application PCT/JP2021/023076, filed on Jun. 17, 2021, 8 pages including English Translation.
(Continued)

*Primary Examiner* — Zachary L Kuhfuss
(74) *Attorney, Agent, or Firm* — XSENSUS LLP (57) ABSTRACT

A linear transport apparatus includes a transport cart, a first roller that rotates about a first rotation shaft extending from the transport cart along a first direction, a second roller that rotates about a second rotation shaft extending from the transport cart and forming an acute angle with the first rotation shaft, and a rail sandwiched between the first and second rollers to extend along a track on which the transport cart moves. The rail includes a first contact portion coming contact with the first roller and restricting movement of the transport cart in a second direction perpendicular to a direction in which the rail extends and the first direction, and
(Continued)

a second contact portion that comes into contact with the second roller and is parallel to the second rotation shaft, and the rail includes a portion in which curvature of the track moves is different from another portion.

22 Claims, 7 Drawing Sheets

(51) Int. Cl.
  *B61L 13/04* (2006.01)
  *B61L 25/02* (2006.01)
  *B65G 35/06* (2006.01)
(58) Field of Classification Search
  USPC ................................. 104/244, 245, 246, 290
  See application file for complete search history.

(56) References Cited

U.S. PATENT DOCUMENTS

| | | | |
|---|---|---|---|
| 5,664,503 A * | 9/1997 | Kawai | B61B 13/04 105/377.05 |
| 8,833,263 B2 | 9/2014 | Fanshawe et al. | |
| 10,414,596 B2 | 9/2019 | Monti | |
| 2013/0192487 A1 | 8/2013 | Fanshawe et al. | |
| 2015/0027338 A1* | 1/2015 | Aumann | B65G 54/02 104/290 |
| 2016/0031648 A1 | 2/2016 | Prüssmeier et al. | |
| 2019/0218038 A1 | 7/2019 | Monti | |
| 2020/0003257 A1* | 1/2020 | Neufeld | B65G 54/02 |
| 2021/0122588 A1* | 4/2021 | Borchardt | B65G 39/12 |
| 2022/0416637 A1 | 12/2022 | Nakagome et al. | |

FOREIGN PATENT DOCUMENTS

| | | |
|---|---|---|
| JP | 9-308018 A | 11/1997 |
| JP | 2809057 B2 | 10/1998 |
| JP | 6 685 484 B1 | 4/2020 |

OTHER PUBLICATIONS

Decision to Grant dated Feb. 15, 2022, received for JP Application 2021-563170, 4 pages including English Translation.

German Office Action dated Aug. 11, 2023 in corresponding German Patent Application No. 11 2021 005 863.0 (with English Summary), 8 pages.

* cited by examiner

LINEAR TRANSPORT APPARATUS

CROSS-REFERENCE TO RELATED APPLICATION

The present application is based on PCT filing PCT/JP2021/023076, filed Jun. 17, 2021, the entire contents of which are incorporated herein by reference.

FIELD

The present disclosure relates to a linear transport apparatus that moves a transport cart along a track defined by a rail.

BACKGROUND

Linear transport apparatuses are apparatuses in which transport carts move along tracks defined by rails. The rail is fixed to, for example, a base. A stator provided on the base and a mover provided on the transport cart constitute a linear motor. The transport cart moves along the track by driving force generated in the mover by controlling energization to the stator or the mover.

For the purpose of supporting the weight of the transport cart, maintaining the positional relationship between the stator and the mover, and restricting the movement of the transport cart in a direction other than the direction along the track, the linear transport apparatus employs a configuration in which the rail is sandwiched between rollers that each rotate about a rotation shaft extending from the transport cart.

In the linear transport apparatus, the curvature of the track on which the transport cart moves may change. For example, the track includes a linear track portion in which the transport cart moves linearly and a curved track portion in which the transport cart moves curvilinearly. In addition, the curved track portion may have different curvatures.

For example, it is known that when the width of the rail is made constant in portions having different curvatures, such as a linear track portion and a curved track portion, a gap is generated between the roller and the rail in some locations. Consequently, the transport cart rattles and cannot be accurately moved along the track.

Patent Literature 1 discloses a configuration in which rollers are movable so that the distance between the rollers is variable, and a biasing means that presses the rollers against a rail is provided to prevent a gap from being generated between the rollers and the rail.

CITATION LIST

Patent Literature

Patent Literature 1: Japanese Patent Application Laid-open No. H07-048030

SUMMARY

Technical Problem

In the technology disclosed in Patent Literature 1, it is necessary to attach the biasing means and a mechanism that enables movement of the rollers to the transport cart, and the weight of the transport cart thus increases. On the other hand, in a case where the width of the rail is changed in accordance with the curvature of the track, it is difficult to design, manufacture, assemble, and inspect the rail and the base.

The present disclosure has been made in view of the above, and an object thereof is to obtain a linear transport apparatus capable of moving a transport cart on a track including a curved track without changing a rail width, and preventing an increase in weight of the transport cart.

Solution to Problem

In order to solve the above-described problems and achieve the object, a linear transport apparatus according to the present disclosure includes a transport cart; a first roller to rotate about a first rotation shaft extending from the transport cart along a first direction; a second roller to rotate about a second rotation shaft extending from the transport cart and forming an acute angle with the first rotation shaft; and a rail sandwiched between the first roller and the second roller to extend along a track on which the transport cart moves. The rail includes a first contact portion to come into contact with the first roller and restrict movement of the transport cart in a second direction perpendicular to a direction in which the rail extends and to the first direction, and a second contact portion to come into contact with the second roller and be parallel to the second rotation shaft, and the rail includes a portion in which a curvature of the track on which the transport cart moves is different from another portion.

Advantageous Effects of Invention

According to the present disclosure, an effect s obtained whereby it is possible to obtain a linear transport apparatus capable of moving a transport cart on a track including a curved track without changing a rail width, and preventing an increase in weight of the transport cart.

DESCRIPTION OF EMBODIMENTS

Hereinafter, a linear transport apparatus according to embodiments of the present disclosure will be described in detail with reference to the drawings.

First Embodiment

Figure 1:
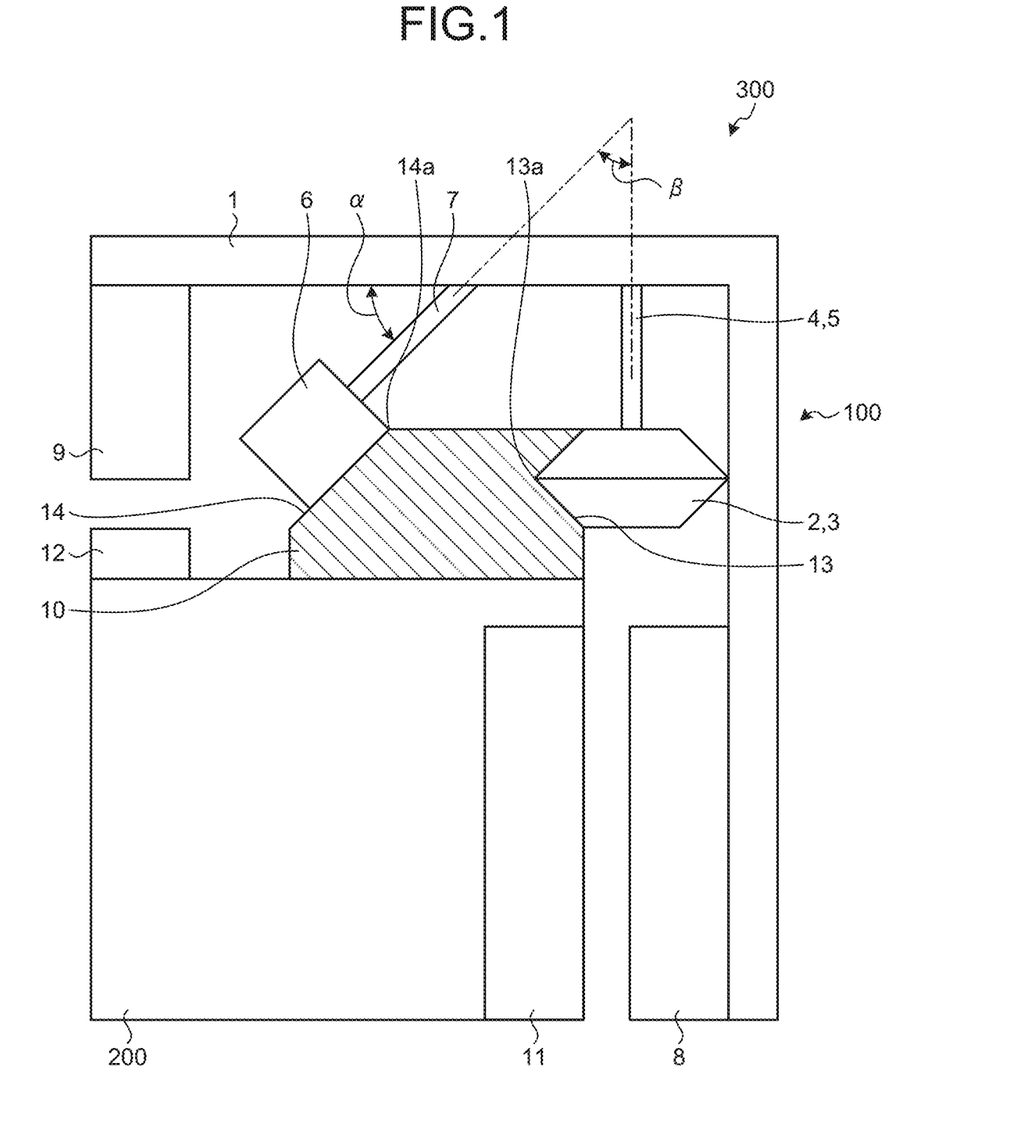
FIG. 1 is a cross-sectional view illustrating a schematic configuration of a linear transport apparatus according to a first embodiment of the present disclosure.

FIG. 1 is a cross-sectional view illustrating a schematic configuration of a linear transport apparatus according to a first embodiment of the present disclosure. Expressions of up, down, left, and right in the following description indicate up, down, left, and right on the paper surface of FIG. 1. A linear transport apparatus 300 includes a base 200, a transport cart 100, and a rail 10. The rail 10 to be described later is fixed to the base 200. A stator 11 is provided on a side surface of the base 200. The base 200 includes a position detector 12.

The rail 10 is fixed to the base 200. The rail 10 is sandwiched between main rollers 2 and 3 and an inclined roller 6 to be described later, and extends along a track on which the transport cart 100 moves.

Figure 2:
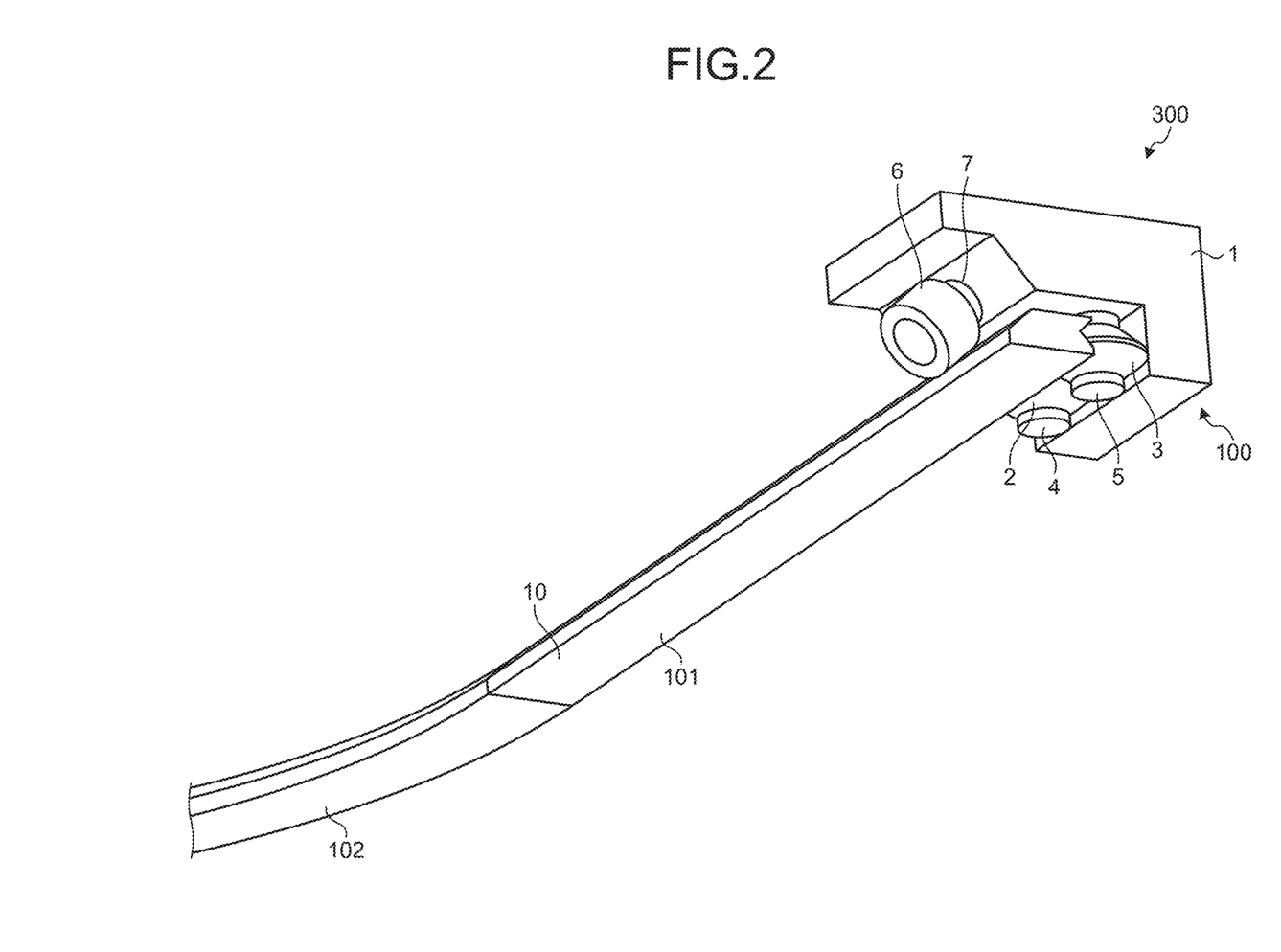
FIG. 2 is a perspective view of the linear transport apparatus illustrated in FIG. 1.

FIG. 2 is a perspective view of the linear transport apparatus illustrated in FIG. 1. In FIG. 2, the base, the mover, and the position detection target are omitted. As illustrated in FIG. 2, the rail 10 is formed in a shape extending along the track. The rail 10 includes a linear track portion 101 forming a linear track and a curved track portion 102 forming a curved track.

Returning to FIG. 1, a groove 13 in which the main rollers 2 and 3 to be described later are fitted is formed in the rail 10. The groove 13 extends along the track. An inner surface of the groove 13 serves as a first contact portion with which the main rollers 2 and 3 come into contact. The rail 10 is formed with an inclined surface 14 with which the inclined roller 6 to be described later comes into contact. The inclined surface 14 extends along the track. The inclined surface 14 serves as a second contact portion with which the inclined roller 6 comes into contact, and restricts the movement of the transport cart 100 in a second direction perpendicular to the direction in which the rail 10 extends and to an up and down direction, which is a first direction.

The transport cart 100 includes a main structural body 1. An object to be moved along the track is placed or fixed on the main structural body 1. The main structural body 1 includes a front main roller shaft 4 extending along the first direction. The main structural body 1 includes a front main roller 2 that rotates about the front main roller shaft 4. The first direction is a downward direction from the main structural body 1. The front main roller 2 has a shape in which bottom surfaces of truncated cones are joined to each other, and is fitted into the groove 13 formed in the rail 10. When the transport cart 100 moves along the track, the front main roller 2 rotates on the inner surface of the groove 13. The inner surface of the groove 13 is a rolling surface on which the front main roller 2 rolls.

The main structural body 1 includes a rear main roller shaft 5 extending from the main structural body 1 along the first direction. The main structural body 1 includes a rear main roller 3 that rotates about the rear main roller shaft 5. The rear main roller 3 has a shape in which bottom surfaces of truncated cones are joined to each other, and is fitted into the groove 13 formed in the rail 10. When the transport cart 100 moves along the track, the rear main roller 3 rotates on the inner surface of the groove 13. The inner surface of the groove 13 is a rolling surface on which the rear main roller 3 rolls.

By the front main roller 2 and the rear main roller 3 fitted in the groove 13, the movement of the transport cart 100 in the up and down direction is restricted. Further, by the front main roller 2 and the rear main roller 3 coming into contact with the inner surface of the groove 13, the movement of the transport cart 100 to the left is restricted. Note that the shapes of the front main roller 2 and the rear main roller 3 are not limited to the shapes illustrated in FIGS. 1 and 2, and can be any shapes as long as they can be fitted in the groove 13 to restrict the movement of the transport cart 100 in the up and down direction. Further, the front main roller 2 and the rear main roller 3 are also simply referred to as the main rollers 2 and 3 without distinction. Furthermore, the front main roller shaft 4 and the rear main roller shaft 5 are also simply referred to as the main roller shafts 4 and 5 without distinction. The main rollers 2 and 3 are first rollers. The main roller shafts 4 and 5 are first rotation shafts. The position along the up and down direction of the inner surface of the groove 13 with which the main rollers 2 and 3 come into contact is constant on the rail 10.

Here, the direction from the rear main roller 3 toward the front main roller 2, that is, the direction going into the paper surface of FIG. 1 is referred to as front, and the direction from the front main roller 2 toward the rear main roller 3, that is, the direction out of the paper surface of FIG. 1 is referred to as rear.

The main structural body 1 includes an inclined roller shaft 7 extending from the main structural body 1 and forming an acute angle Q with the main roller shafts 4 and 5. The main structural body 1 includes the inclined roller 6 that rotates about the inclined roller shaft 7. The inclined roller 6 comes into contact with the inclined surface 14 of the rail 10. The inclined roller shaft 7, a side surface of the inclined roller 6, and the inclined surface 14 are parallel to each other. The inclined roller shaft 7 is a second rotation shaft. The inclined roller 6 is a second roller. The inclined surface 14 is a second contact portion with which the inclined roller 6 comes into contact. By the inclined roller 6 coming into contact with the inclined surface 14, the movement of the transport cart 100 to the right is restricted.

The main structural body 1 includes a mover 8 at a position facing the stator 11 provided on the base 200. The mover 8 and the stator 11 are a magnet or a coil, and the mover 8 and the stator 11 constitute a linear motor. When the mover 8 or the stator 11 is energized, an electromagnetic force for moving the mover 8 along the track is generated, and the transport cart 100 including the mover 8 moves along the track.

The main structural body 1 includes a position detection target 9. The position detector 12 provided on the base 200 detects the position detection target 9, so that the position of the transport cart 100 on the track is detected. The electromagnetic force generated from the linear motor including the mover 8 and the stator 11 is adjusted according to the position of the transport cart 100 to allow drive control of the speed, position, and the like of the transport cart 100. Note that the positions at which the position detection target 9 and the position detector 12 are provided may be switched.

Figure 3:
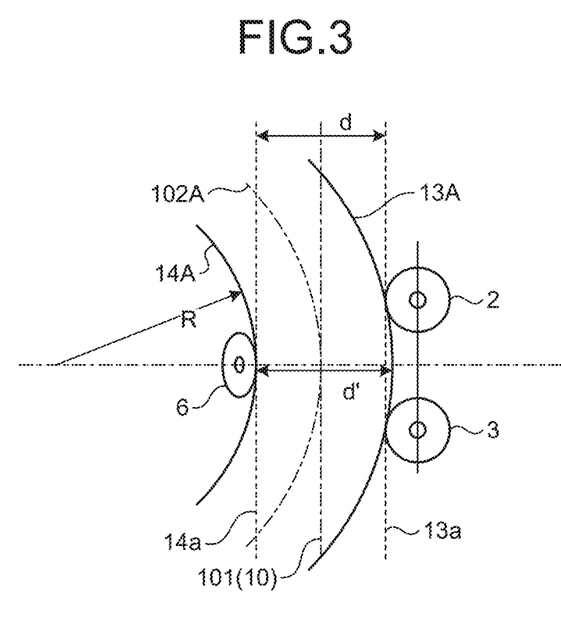
FIG. 3 is a diagram for conceptually describing a difference in rail width between a linear track portion and a curved track portion.

FIG. 3 is a diagram for conceptually describing a difference in rail width between the linear track portion and the curved track portion. In FIG. 3, for easy understanding of the width of the rail 10, the linear track portion 101 and a virtual curved track portion 102A wider than the curved track portion 102 are displayed in a superimposed manner on a plane. In addition, the linear track portion 101 is indicated by a broken line, and the virtual curved track portion 102A is indicated by a solid line. Further, a width d of the linear track portion 101 is a distance between a position 14a of the inclined surface 14 in contact with the uppermost end of the inclined roller 6 and a position 13a that is a bottom portion of the groove 13. A width d' of the virtual curved track portion 102A is a distance between a position 14A of the inclined surface 14 in contact with the uppermost end of the inclined roller 6 and a position 13A that is a bottom portion of the groove 13.

In the linear track portion 101, the main rollers 2 and 3 and the inclined roller 6 are in contact with the rail 10 (linear track portion 101) having the width d. On the other hand, the virtual curved track portion 102A has side surfaces in contact with the main rollers 2 and 3 and the inclined roller 6, but a width d' of the virtual curved track portion 102A is larger than the width d of the linear track portion 101. Thus, if the rail 10 has the same width in the linear track portion 101 and the curved track portion having different curvatures of the track, a gap is generated between the rollers and the guide rail in the curved track portion. Therefore, in a case where the curvature of the track changes, it is necessary to make the width of the rail 10 differ between the linear track portion 101 and the curved track portion 102 in order to bring the side surfaces into contact with the main rollers 2 and 3 and the inclined roller 6.

Further, in the vicinity of the coupling portion between the linear track portion 101 and the curved track portion 102 illustrated in FIG. 2, there is a transition process in which the front main roller 2 is in contact with the curved track portion 102 and the rear main roller 3 is in contact with the linear track portion 101 during the transition. In the transition process, the width of the rail 10 for maintaining contact between the front main roller 2, the rear main roller 3 and the inclined roller 6 and the rail 10 is not constant, and continuously changes depending on the position of the transport cart 100.

In addition, in a case where the curvature of the track changes as in the transition process between the linear track portion 101 and the curved track portion 102, an impulsive centrifugal force and a moment load may be applied to the transport cart 100 along with the change in curvature. In order to reduce such centrifugal force and moment load, a buffer curve such as a clothoid curve is used in some cases so that the track curvature changes smoothly. In such a case as well, the width of the rail 10 continuously changes.

The rail 10 having different widths along the track makes it difficult to design, manufacture, assemble, and inspect the rail 10 and the base 200. The rail 10 is typically designed and manufactured in segments and assembled such that multiple parts manufactured in segments are coupled together on the base 200. For example, the linear track portion 101 and the curved track portion 102 illustrated in FIG. 2 are manufactured in segments.

For smooth movement of the transport cart 100, a large step should not be generated on the rolling surface at the coupling portion between the plurality of parts, and it is important to control a rolling surface tolerance at the coupling portion. The rail 10 having different widths along the track makes specification of the tolerance at each position, inspection of the width of the rail 10 after manufacture and assembly, configuration of jigs for inspection, and the like complicated.

In particular, in the linear transport apparatus 300, two to nine parts are densely arranged in the main structural body 1 in order to reduce the size and weight of the transport cart 100. For this reason, it is necessary to densely arrange 10 to 12 parts within a surface facing the transport cart 100 also in the base 200. In a case where the width of the rail 10 is not constant, many restrictions are imposed on the layout design, assembly, and inspection of parts densely arranged within the surface of the base 200 facing the transport cart 100, which is complicated.

In addition, in a case where the width of the rail 10 is changed according to the change in the curvature of the track, the width of the rail is uniquely determined by the curvature of the track, and the degree of freedom in designing the rail 10 is reduced. If the width of the rail 10 can be designed independently of the change in curvature of the track while maintaining contact between the main rollers 2 and 3 and the inclined roller 6 and the rail 10, the degree of freedom in design is improved.

Figure 4:
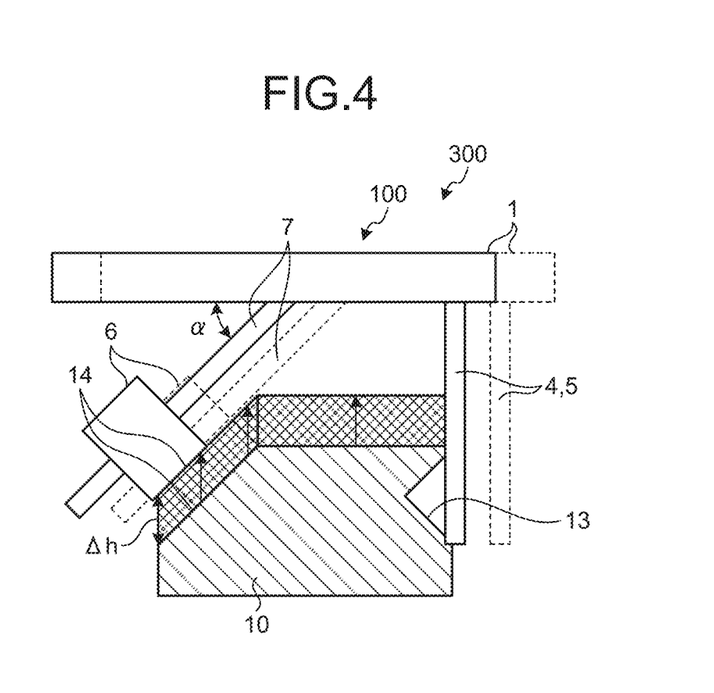
FIG. 4 is a cross-sectional view of the linear transport apparatus according to the first embodiment.

FIG. 4 is a cross-sectional view of the linear transport apparatus according to the first embodiment. In FIG. 4, a portion of the curved track portion 102 common to the linear track portion 101 is indicated by hatching in which lines do not cross each other, and a portion of the curved track portion 102 different from the linear track portion 101 is indicated by cross-hatching. In addition, the transport cart 100 in the linear track portion 101 is indicated by a broken line, and the transport cart 100 in the curved track portion 102 is indicated by a solid line. Further, illustration of the main rollers 2 and 3 is omitted.

In the linear transport apparatus 300 according to the first embodiment, the position of the inclined surface 14 along the up and down direction is changed by $\Delta h$ in the curved track portion 102 without changing the width of the rail 10 by utilizing an inclination angle $\alpha$ of the inclined roller shaft 7. Thus, it is possible to fill a gap $\Delta x (=|d'-d|)$ between the inclined roller 6 and the inclined surface 14 that may occur in the curved track portion 102 and to bring the inclined roller 6 into contact with the inclined surface 14; therefore, it is possible to maintain contact between the main rollers 2 and 3 and the inclined roller 6 and the rail 10.

Therefore, the width of the rail 10 can be designed independently of the track of the transport cart 100 while maintaining contact between the main rollers 2 and 3 and the inclined roller 6 and the rail 10 without providing a mechanism for moving the main rollers 2 and 3 and the inclined roller 6 on the transport cart 100, and the width of the rail 10 can be made the same on the entire track.

Here, the gap $\Delta x$ and a change amount $\Delta h$ of the position of the inclined surface 14 along the up and down direction can be expressed by the following formula using the inclination angle $\alpha$ of the inclined roller shaft 7.

$$\Delta h = \Delta x \cdot \tan \alpha \quad (1).$$

Note that the inclination angle $\alpha$ represents an angle formed by a horizontal plane and the inclined roller shaft 7, and when the angle $\beta$ formed by the main roller shafts 4 and 5 and the inclined roller shaft 7 is used, $\alpha = 90 - \beta$. Note that, in the example illustrated in FIG. 4, the position of the entire upper surface of the rail 10 including the inclined surface 14 is made different along the up and down direction. Thus, the length of the region provided closer to the main roller shafts 4 and 5 than the inclined surface 14 along the second direction is constant on the rail 1. The second direction is perpendicular to the track on which the transport cart 100 moves and perpendicular to the up and down direction.

A method of designing the rail 10 will be described. First, the history of the gap $\Delta x$ on the track is obtained according to the change in curvature of the track of the transport cart 100. Then, the history of the change amount $\Delta h$ of the position of the inclined surface 14 along the up and down direction calculated from the gap $\Delta x$, the inclination angle $\alpha$ of the inclined roller shaft 7, and the above formula (1) is obtained, and the rail 10 is designed based on the change amount Δh.

According to the first embodiment, the width of the rail 10 is constant, and thus design, assembly, and inspection of the rail 10 are facilitated. Since it is not necessary to provide a mechanism for moving the main rollers 2 and 3 and the inclined roller 6 on the transport cart 100, an increase in the weight of the transport cart 100 can be prevented.

Further, as described above, in order to reduce the size and weight of the transport cart 100 in the linear transport apparatus 300, it is necessary to densely arrange the parts of the rail 10, the stator 11, and the position detector 12 within the surface facing the transport cart 100 also on the base 200. In a case where the width of the rail 10 is not constant, it is difficult to predict a region on the base 200 where the parts can be arranged, which makes designing of a densely arrangement, assembly, and inspection of the parts complicated. In contrast, in a case where the width of the rail 10 is constant, it is easy to predict the region on the base 200 where the parts can be arranged, which facilitates design, assembly, and inspection.

Figure 5:
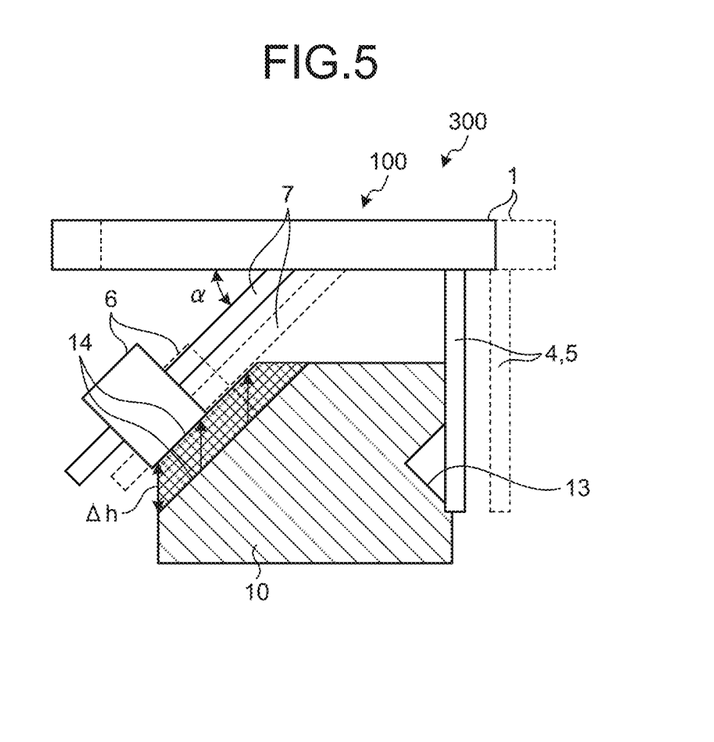
FIG. 5 is a cross-sectional view of a linear transport apparatus according to a first modification of the first embodiment.

FIG. 5 is a cross-sectional view of a linear transport apparatus according to a first modification of the first embodiment. As illustrated in FIG. 5, in a region other than the inclined surface 14, the height along the up and down direction of the rail 10 may be made constant in the linear track portion 101 and the curved track portion 102. In the linear transport apparatus 300 according to the first modification as well, since the height of part of the rail 10 is constant in addition to the width of the rail 10, it is possible to further facilitate the design, manufacture, assembly, and inspection of the rail 10 and the like.

Figure 6:
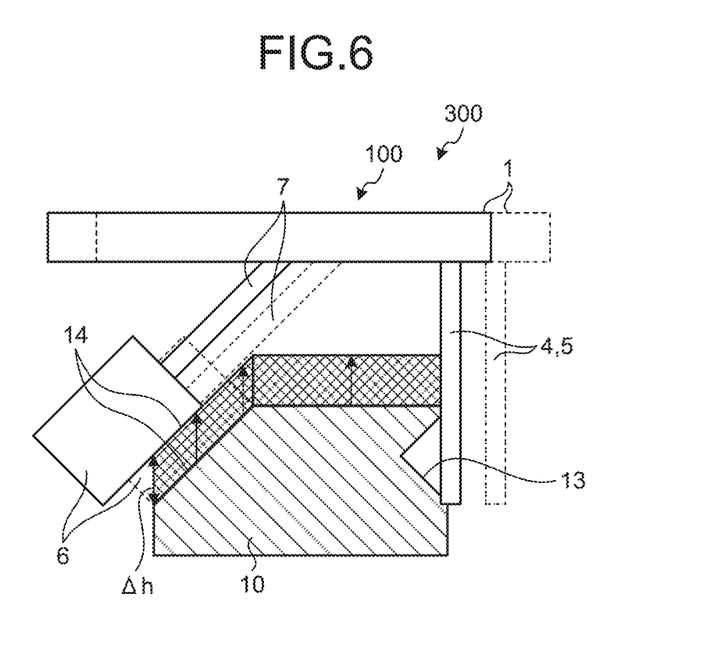
FIG. 6 is a cross-sectional view of a linear transport apparatus according to a comparative example.

FIG. 6 is a cross-sectional view of a linear transport apparatus according to a comparative example. In the comparative example, part of the inclined roller 6 extends beyond the inclined surface 14 and is not in contact with the inclined surface 14 depending on the position of the transport cart. In this case, the portion of the inclined roller 6 that is in contact with the inclined surface 14 wears quickly, and rattling or the like occurs between the inclined surface 14 and the inclined roller 6, so that smooth movement of the transport cart 100 may be hindered. In contrast, by always making the entire inclined roller 6 contact with the inclined surface 14 as in the example illustrated in FIG. 4, it is possible to prevent partial wear of the inclined roller 6 and maintain smooth movement of the transport cart 100.

Further, the smaller the inclination angle α of the inclined roller shaft 7 is, the smaller the change amount Δh of the position of the inclined surface 14 along the up and down direction can be made. On the other hand, the inclination angle α is preferably larger than or equal to a predetermined value in terms of setting of various tolerances of the height along the up and down direction of the inclined surface 14, adjustment of support rigidity of the transport cart 100 in the up and down and left and right directions, and the like. The inclination angle α is only required to be determined in consideration of these conditions.

Further, in the first embodiment, a portion of the main rollers 2 and 3 where the bottom surfaces of the truncated cones are joined and fitted into the groove 13 and the groove 13 have a V-shaped cross-section but there is no limitation thereto. The portion of the main rollers 2 and 3 fitted into the groove 13 and the groove 13 may have a U-shaped cross-section. Alternatively, the main rollers 2 and 3 may be flat rollers, and a portion with which the main rollers 2 and 3 are in contact may be a flat rail. In a case when the flat roller and the flat rail are used, there is no support rigidity in the up and down direction, and thus the inclination angle α of the inclined roller shaft 7 needs to be made smaller than that in a case where the portion of the main rollers 2 and 3 fitted in the groove 13 and the groove 13 have a V-shaped or U-shaped cross-section.

In the first embodiment, since the position along the up and down direction of the transport cart 100 can also be made constant along the entire track, the positional relationship between the mover 8 and the stator 11 along the up and down direction and the gap between the position detection target 9 and the position detector 12 in the up and down direction can be made constant along the entire track. Thus, stable electromagnetic characteristics and position detection accuracy of the linear motor can be obtained in the entire track of the transport cart 100.

Figure 7:
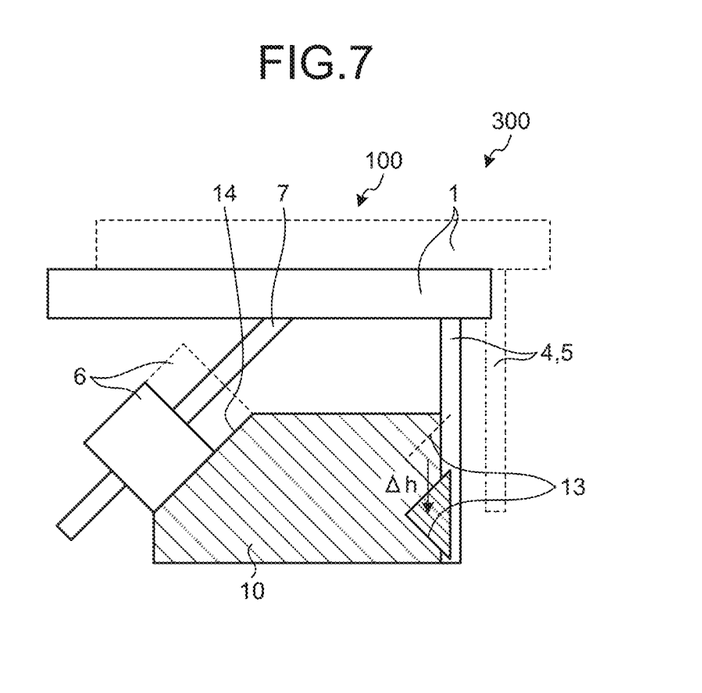
FIG. 7 is a cross-sectional view of a linear transport apparatus according to a second modification of the first embodiment.

FIG. 7 is a cross-sectional view of a linear transport apparatus according to a second modification of the first embodiment. In the linear transport apparatus 300 according to the second modification, the position of the inclined surface 14 along the up and down direction is constant, but the position of the groove 13 along the up and down direction is changed on the track. The change amount in the position along the up and down direction of the groove 13 is the same as the change amount Δh illustrated in FIG. 4, but the direction of the change is upside down.

In this second modification, only the position where the groove 13 is formed changes in the cross-section of the rail 10 along the entire track, and external shape dimensions such as the width and height of the rail 10 itself and the position of the inclined surface 14 are the same along the entire track. Thus, the work of design, manufacture, assembly, and inspection of the linear transport apparatus 300 is further facilitated.

In this second modification, the position of the transport cart 100 along the up and down direction also changes on the track along with the change in the position of the groove 13 along the up and down direction. As a result, the positional relationship between the mover 8 and the stator 11 along the up and down direction and the gap between the position detection target 9 and the position detector 12 change depending on the position of the transport cart 100 on the track. Depending on the change amounts thereof, the electromagnetic characteristics of the linear motor may be deteriorated, or the position detection accuracy of the transport cart 100 may be deteriorated. In this case, the inclination angle α is only required to be determined also in consideration of the changes in the electromagnetic characteristics of the linear motor and the changes in the position detection accuracy of the transport cart 100.

Figure 8:
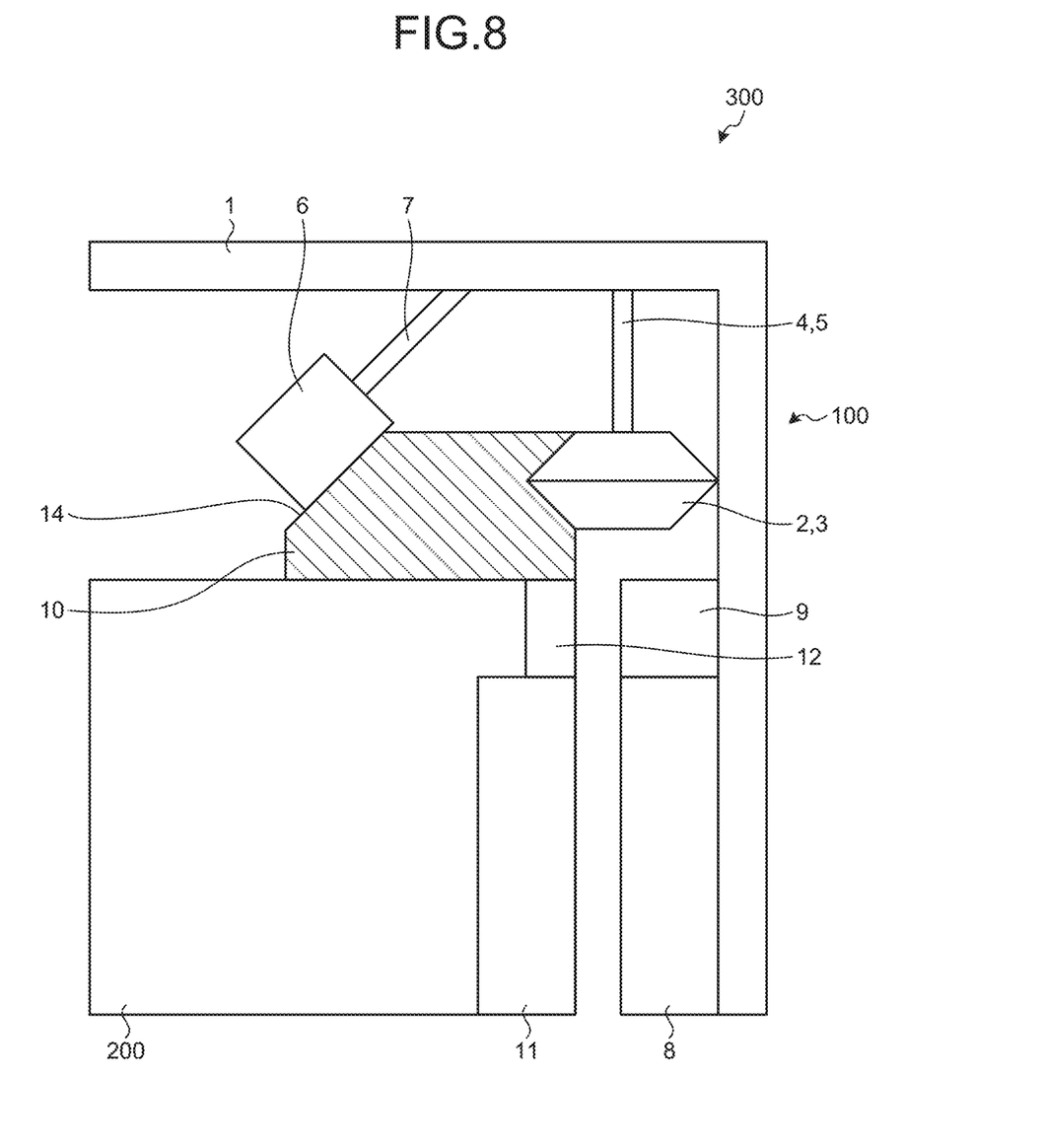
FIG. 8 is a cross-sectional view of a linear transport apparatus according to a third modification of the first embodiment.

FIG. 8 is a cross-sectional view of a linear transport apparatus according to a third modification of the first embodiment. As illustrated in FIG. 8, the position detection target 9 and the position detector 12 may be arranged on a side surface where the base 200 and the transport cart 100 face each other, that is, a surface parallel to the tangential direction of the track on which the transport cart 100 moves, so that the gap between the position detection target 9 and the position detector 12 does not change on the rail 10.

Figure 9:
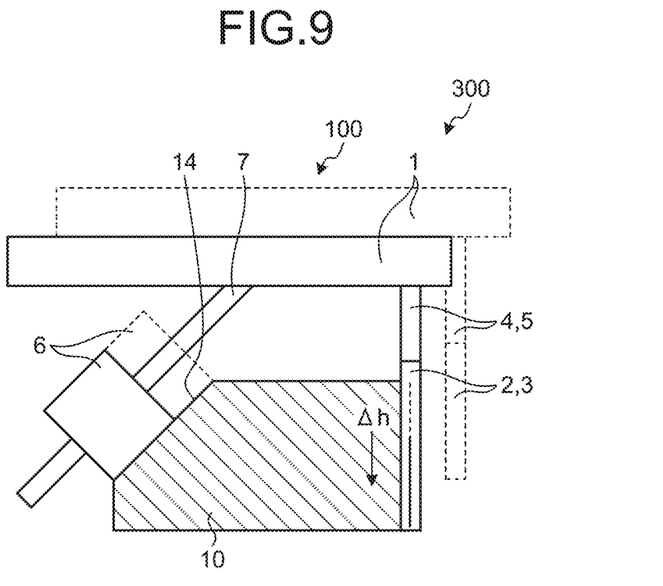
FIG. 9 is a cross-sectional view of a linear transport apparatus according to a fourth modification of the first embodiment.

FIG. 9 is a cross-sectional view of a linear transport apparatus according to a fourth modification of the first embodiment. In this fourth modification, the main rollers 2 and 3 are flat rollers and do not have a shape to be fitted into a groove. In this case, even if the positions of the main rollers 2 and 3 along the up and down direction move by the change amount Δh, it is still possible to maintain contact between the main rollers 2 and 3 and the inclined roller 6 and the rail 10 by setting the height of the side surface of the rail 10 and the length along the up and down direction of the main rollers 2 and 3 such that the main rollers 2 and 3 are in contact with the side surface of the rail 10. In this fourth modification, since the cross-sectional shape of the rail 10 can be the same along the entire track, it is possible to further facilitate the work of design, manufacture, assembly, and inspection of the linear transport apparatus 300.

The configurations described in the above embodiments are examples, and can be combined with another known technique, and part of the configurations can be omitted or changed without departing from the gist.

REFERENCE SIGNS LIST 1 main structural body; 2 front main roller; 3 rear main roller; 4 front main roller shaft; 5 rear main roller shaft; 6 inclined roller; 7 inclined roller shaft; 8 mover; 9 position detection target; 10 rail; 11 stator; 12 position detector; 13 groove; 14 inclined surface; 100 transport cart; 101 linear track portion; 102 curved track portion; 102A virtual curved track portion; 200 base; 300 linear transport apparatus.

The invention claimed is:

1. A linear transport apparatus, comprising;
a transport cart;
a first roller to rotate about a first rotation shaft extending from the transport cart along a first direction;
a second roller to rotate about a second rotation shaft extending from the transport cart and forming an acute angle with the first rotation shaft; and
a rail sandwiched between the first roller and the second roller to extend along a track on which the transport cart moves, wherein
the rail includes
a first contact portion to come into contact with the first roller and restrict movement of the transport cart in the first direction and in a second direction perpendicular to a direction in which the rail extends and perpendicular to the first direction, and
a second contact portion to come into contact with the second roller and be parallel to the second rotation shaft,
the rail includes a portion in which a curvature of the track on which the transport cart moves is different from another portion, and
a position of the second contact portion along the first direction differs between portions having different curvatures.

2. The linear transport apparatus according to claim 1, wherein a position of the first contact portion along the first direction is constant on the rail.

3. The linear transport apparatus according to claim 2, wherein the second roller is entirely in contact with the second contact portion on the rail in a direction along the second rotation shaft.

4. The linear transport apparatus according to claim 3, further comprising:
a base on which the rail is placed;
a mover provided on the transport cart;
a stator provided on the base to form a linear motor together with the mover;
a position detector provided on one of the base and the transport cart; and
a position detection target provided on another of the base and the transport cart, where a position of the position detection target is detected by the position detector, wherein
the mover, the stator, the position detector, and the position detection target are provided on side surfaces on which the base and the transport cart face each other, the side surfaces being parallel to a tangential direction of the first rotation shaft and the rail.

5. The linear transport apparatus according to claim 2, further comprising:
a base on which the rail is placed;
a mover provided on the transport cart;
a stator provided on the base to form a linear motor together with the mover;
a position detector provided on one of the base and the transport cart; and
a position detection target provided on another of the base and the transport cart, where a position of the position detection target is detected by the position detector, wherein
the mover, the stator, the position detector. and the position detection target are provided on side surfaces on which the base and the transport cart face each other, the side surfaces being parallel to a tangential direction of the first rotation shaft and the rail.

6. The linear transport apparatus according to claim 1, wherein a length along the second direction of a region provided closer to the first rotation shaft than the second contact portion of the rail is constant on the rail.

7. The linear transport apparatus according to claim 6, wherein the second roller is entirely in contact with the second contact portion on the rail in a direction along the second rotation shaft.

8. The linear transport apparatus according to claim 7, further comprising:
a base on which the rail is placed;
a mover provided on the transport cart;
a stator provided on the base to form a linear motor together with the mover;
a position detector provided on one of the base and the transport cart; and
a position detection target provided on another of the base and the transport cart, where a position of the position detection target is detected by the position detector, wherein
the mover, the stator, the position detector, and the position detection target are provided on side surfaces on which the base and the transport cart face each other, the side surfaces being parallel to a tangential direction of the first rotation shaft and the rail.

9. The linear transport apparatus according to claim 6, further comprising:
a base on which the rail is placed;
a mover provided on the transport cart;
a stator provided on the base to form a linear motor together with the mover;
a position detector provided on one of the base and the transport cart; and
a position detection target provided on another of the base and the transport cart, where a position of the position detection target is detected by the position detector, wherein
the mover, the stator, the position detector, and the position detection target are provided on side surfaces on which the base and the transport cart face each other, the side surfaces being parallel to a tangential direction of the first rotation shaft and the rail.

10. The linear transport apparatus according to claim 1, wherein the second roller is entirely in contact with the second contact portion on the rail in a direction along the second rotation shaft.

11. The linear transport apparatus according to claim 10, further comprising:
a base on which the rail is placed;
a mover provided on the transport cart;
a stator provided on the base to form a linear motor together with the mover;
a position detector provided on one of the base and the transport cart; and
a position detection target provided on another of the base and the transport cart, where a position of the position detection target is detected by the position detector, wherein
the mover, the stator, the position detector, and the position detection target are provided on side surfaces on which the base and the transport cart face each other, the side surfaces being parallel to a tangential direction of the first rotation shaft and the rail.

12. The linear transport apparatus according to claim 1, further comprising:
a base on which the rail is placed;
a mover provided on the transport cart;
a stator provided on the base to form a linear motor together with the mover;
a position detector provided on one of the base and the transport cart; and
a position detection target provided on another of the base and the transport cart, where a position of the position detection target is detected by the position detector, wherein
the mover, the stator, the position detector, and the position detection target are provided on side surfaces on which the base and the transport cart face each other, the side surfaces being parallel to a tangential direction of the first rotation shaft and the rail.

13. The linear transport apparatus according to claim 12, further comprising:
a base on which the rail is placed;
a mover provided on the transport cart;
a stator provided on the base to form a linear motor together with the mover;
a position detector provided on one of the base and the transport cart; and
a position detection target provided on another of the base and the transport cart, where a position of the position detection target is detected by the position detector, wherein
the mover, the stator, the position detector, and the position detection target are provided on side surfaces on which the base and the transport cart face each other, the side surfaces being parallel to a tangential direction of the first rotation shaft and the rail.

14. The linear transport apparatus according to claim 1, wherein a length along the second direction of a region provided closer to the first rotation shaft than the second contact portion of the rail is constant on the rail.

15. The linear transport apparatus according to claim 14, wherein the second roller is entirely in contact with the second contact portion on the rail in a direction along the second rotation shaft.

16. The linear transport apparatus according to claim 14, further comprising:
a base on which the rail is placed;
a mover provided on the transport cart;
a stator provided on the base to form a linear motor together with the mover;
a position detector provided on one of the base and the transport cart; and
a position detection target provided on another of the base and the transport cart, where a position of the position detection target is detected by the position detector, wherein
the mover, the stator, the position detector, and the position detection target are provided on side surfaces on which the base and the transport cart face each other, the side surfaces being parallel to a tangential direction of the first rotation shaft and the rail.

17. The linear transport apparatus according to claim 14, further comprising:
a base on which the rail is placed;
a mover provided on the transport cart;
a stator provided on the base to form a linear motor together with the mover;
a position detector provided on one of the base and the transport cart; and
a position detection target provided on another of the base and the transport cart, where a position of the position detection target is detected by the position detector, wherein
the mover, the stator, the position detector, and the position detection target are provided on side surfaces on which the base and the transport cart face each other, the side surfaces being parallel to a tangential direction of the first rotation shaft and the rail.

18. The linear transport apparatus according to claim 1, wherein
the rail includes an inclined surface, and
the second roller is in contact with the inclined surface so as not to cause a gap between the second roller and the inclined surface at the portion in which the curvature of the track on which the transport cart moves is different from the another portion.

19. A linear transport apparatus, comprising:
a transport cart;
a first roller to rotate about a first rotation shaft extending from the transport cart along a first direction;
a second roller to rotate about a second rotation shaft extending from the transport cart and forming an acute angle with the first rotation shaft; and
a rail sandwiched between the first roller and the second roller to extend along a track on which the transport cart moves, wherein
the rail includes
a first contact portion to come into contact with the first roller and restrict movement of the transport cart in the first direction and in a second direction perpendicular to a direction in which the rail extends and perpendicular to the first direction, and
a second contact portion to come into contact with the second roller and be parallel to the second rotation shaft,
the rail includes a portion in which a curvature of the track on which the transport cart moves is different from another portion, and
a position of the first contact portion along the first direction changes on the rail between rail portions having different curvatures.

20. The linear transport apparatus according to claim 19, wherein the second roller is entirely in contact with the second contact portion on the rail in a direction along the second rotation shaft.

21. The linear transport apparatus according to claim 19, further comprising:
- a base on which the rail is placed;
- a mover provided on the transport cart;
- a stator provided on the base to form a linear motor together with the mover;
- a position detector provided on one of the base and the transport cart; and
- a position detection target provided on another of the base and the transport cart, where a position of the position detection target is detected by the position detector, wherein
- the mover, the stator the position detector, and the position detection target are provided on side surfaces on which the base and the transport cart face each other, the side surfaces being parallel to a tangential direction of the first rotation shaft and the rail.

22. The linear transport apparatus according to claim 19, wherein
- the rail includes an inclined surface, and
- the second roller is in contact with the inclined surface so as not to cause a gap between the second roller and the inclined surface at the portion in which the curvature of the track on which the transport cart moves is different from the another portion.

* * * * *